United States Patent [19]

Sievers

[11] Patent Number: 4,996,085

[45] Date of Patent: Feb. 26, 1991

[54] REPAIR COMPOSITION AND METHOD

[76] Inventor: G. Kelly Sievers, 1605 W. Magnolia Blvd., Burbank, Calif. 91506

[21] Appl. No.: 443,448

[22] Filed: Nov. 30, 1989

Related U.S. Application Data

[63] Continuation of Ser. No. 74,955, Jul. 17, 1987, abandoned.

[51] Int. Cl.$^5$ ............................................. B32B 35/00
[52] U.S. Cl. ............................. 427/140; 417/DIG. 1; 427/142; 427/386; 428/413; 428/418; 523/458; 523/468
[58] Field of Search ....................... 427/140, 142, 386; 523/458, 468; 417/DIG. 1; 428/413, 418

[56] References Cited

U.S. PATENT DOCUMENTS

| | | | |
|---|---|---|---|
| 4,465,799 | 8/1984 | Platkiewicz et al. | 523/457 |
| 4,524,119 | 6/1985 | Luly et al. | 430/108 |
| 4,544,623 | 10/1985 | Audykowski et al. | 430/280 |

Primary Examiner—Michael Lusignan

[57] ABSTRACT

Mechanical devices having relatively moving parts subject to galling or scoring by contact of the parts are effectively repaired by coating the surfaces to be treated with a composition comprising a hardenable epoxy resin, a reinforcing filler, and an amount of an agent such as graphite or molybdenum disulfide capable of reducing the coefficient of friction of the said composition.

8 Claims, No Drawings

REPAIR COMPOSITION AND METHOD

This application is a continuation of application Ser. No. 07/074,955, filed July 17, 1987, now abandoned.

TECHNICAL FIELD

This invention has to do with repair compositions and more particularly with compositions and methods for the repair of mechanical devices, for example pumps and turbines, which have close-fitting opposed working parts, such as rotors acting in a chamber. In such devices, entry of foreign matter, or deviation of the moving part from its intended path, which can occur when supporting bearings wear, or upon a shock to the system, can result in sporadic or momentary contact of the moving part with the opposing, stationary part of the device. This contact is usually manifested by the appearance of galling, or at a minimum scoring, of the opposed part surface. In either event, the alteration of the surface adversely affects the close tolerances designed into the device, reduces efficiency and ultimately demands a replacement part.

BACKGROUND OF THE INVENTION

In lieu of replacement of the highly engineered parts, various techniques have been developed for the refurbishment of the close tolerance surfaces, including use of coatings such as epoxy resins. The requirements for such coatings include galling resistance, great toughness, high adhesion, good strength, good chemical resistance, easy machinability, absence of toxicity and ease of application. Previously available coatings have met one or more of these criteria, but none before the present invention have met all of them.

SUMMARY OF THE INVENTION

It is accordingly an objective of the present invention to provide and composition useful in the repair of metal parts which meets all of the above criteria, and a method of repair based on the use of the invention composition. It is another objective to incorporate in such repair compositions an added component designed to reduce friction at the wear surface, thus to ameliorate the effect of the inevitable contacts of moving part with stationary part.

The repair composition accordingly is optimum for close tolerance parts, for, in addition to demonstrating the foregoing qualities, it is desirably low in friction to ease damage when contacts occur.

These and other objectives of the invention are met in the low friction, anti-galling repair composition of the invention for treatment of surfaces of mechanical devices having opposed working parts which are occasionally subjected to impact in use, the composition comprising a hardenable epoxy resin, a resin-reinforcing-effective amount of a reinforcing filler other than asbestos, and an agent having a lower coefficient of friction than said epoxy, the agent being dispersed in said composition in composition surface coefficient of friction-reducing amount.

In particular embodiments, the reinforcing filler is inorganic, the agent is graphite, fluorinated carbon, or molybdenum disulfide, the epoxy resin comprises a digylcidyl ether of a dihydric phenol, and a hardener comprising e.g. an amine such as a primary amine is also present.

Typically, the reinforcing filler is present in an amount between 0.3 and 55 parts by weight per 100 parts of said resin, the said reinforcing filler is a mineral, such as kaolin, the low friction agent is present in an amount between 1 and 40 parts be weight per 100 parts by weight of said resin and is graphite, fluorinated carbon, or molybdenum disulfide. In such systems the preferred reinforcing filler is kaolin.

The invention further contemplates the method of repairing mechanical devices having relatively moving parts, including applying to a surface of one of said device parts to be repaired a composition comprising a hardenable epoxy resin, a reinforcing filler and a composition surface coefficient of friction reducing amount of a friction reducing agent comprising graphite, fluorinated carbon, or molybdenum disulfide, curing the composition in adhering relation to the surface, and finishing to a desired dimension.

The invention accordingly provides a laminate of the composition described and the metal surface of a mechanical device having relatively moving parts.

PREFERRED MODES

The term "reinforcing" filler herein refers to typically inorganic materials which can be selected from minerals such as metals, metal oxides, metal salts such as metal aluminates and metal silicates, other siliceous materials and mixtures thereof, other than asbestos and like toxic materials, or carbon fibers. Preferred fillers contain a major weight amount, i.e. more than 50% by weight of metal silicates or siliceous materials. Examples of suitable reinforcing fillers include alumina, feldspar, wollastonite, a calcium metasilicate, crocidolite and other calcium magnesium silicates, quartz, and other forms of silica such as silica gel, ground glass, glass fibers, cristobalite, trydimite, metals such as aluminum, tin, lead, magnesium, calcium, strontium, barium, titanium, zirconium, vanadium, chromium, manganese, iron, cobalt, nickel, copper, and zinc, heavy metal phosphates, sulfides and sulfates in gel form, and minerals and mineral salts such as and especially kaolin, and also spodumene, mullite, mica, montmorillonite, bentonite, hectorite, beidellite, attapulgite, garnet, saponite and hercynite. In addition, graphite functions as a reinforcing filler. Mixtures of two or more of the reinforcing fillers can be used.

The epoxy resin component of the present repair compositions is typically a glycidyl ether of a dihydric phenol prepared e.g. by heating at 50° to 150° C. the dihydric phenol with an epoxide, either a mono or diepoxide, such as epichlorohydrin, using preferably one, two or more moles of epichlorohydrin per mole of the dihydric phenol, typically in the presence of a base such as sodium, potassium, calcium or barium hydroxide in an amount of 10% to 30% stoichiometric excess of the epichlorohydrin, i.e. 1.1 to 1.3 equivalents of base per mole of epichlorohydrin. The heating is continued for several hours to convert the reactants to a taffy-like consistency after which the product is water washed. Reactive diluents such as allyl digylcidyl ether may also be used in the epoxy resin. See also, for example, U.S. Pat. No. 2,503,726 to Greenlee, wherein the dihydric phenol may comprise mononuclear dihydric phenols such as hydroquinone, resorcinol, and the like, or preferably dinuclear phenols comprising joined aromatic rings as in those joined with a carbon to carbon bond and those joined by a divalent radical such as divalent hydrocarbon, e.g. alkylene radicals, such as methylene, ethylene, trimethylene, tetramethylene, pentamethylene, hexamethylene, 2-ethyly hexamethylene, octamethylene, nonamethylene, decamethylene, and the like, or alkylidene radicals such as ethylidene, propylidene, isopropylidene, isobyutylidene, amylidene, isoamylidene, 1-phenyl ethylidene, and the like, cycloaliphatic radicals such as 1,4-cyclohexylene, 1,3-cyclohexylene, cyclohexylidene, and the like, halogenated alkylidene, alkylene, or cycloaliphatic radicals, such as methoxy methylene, ethoxy methylene, ethoxy ethylene, 2-ethoxy trimethylene, 3-ethoxy-2-phenoxy trimethylene, 1,3-(2-phenoxy cyclohexane), and the like, aralkylene radicals such as phenyl ethylene, 2-phenyl trimethylene, 1-phenyl pentamethylene, aromatic radicals such as phenylene, naphthlene and the lie and halogentaed versions thereof and alkoxy and arloxy substituted radicals such as 1,4-(2-n-propoxyphenylene), and the like.

Typical epoxides reacted with the foregoing dihydric phenols are epihalohydrins such as epichlorohydrin and 1,2-epoxy-1-methyl-3-chloropropane, and compounds having two epoxide groups bound together through a carbon to carbon bond or a divalent inorganic or organic radical such as an aliphatic, aromatic, homocyclic, heterocyclic, or acylic arrangement of atoms, sulfur or oxygen. Epoxide group herein refers to a group containing an oxirane oxygen atom bonded to two vicinal aliphatic carbon atoms.

These epoxy resins, such as the general purpose adhesives of the Epibond series of Furane Products Company, e.g. Epibond 1210, are hardened with heat and in the presence of curing agents, such as those of the Epibond series of Furane Products Co., e.g. Nos. 1210B, 9615A and 9861. Also useful in general as hardeners are hardeners heretofore used or known to be useful as epoxy resin hardeners for the foregoing epoxy resins to provide the properties above enumerated. Typical hardeners are the amines including pyridine and piperidine. All hardeners are used in effective amounts for prompt cure under room to moderate temperatures, e.g. up to 250° F.

In addition to the epoxy resin and reinforcing filler the present compositions employ an effective amount of a friction reducing agent such as graphite, in fibrous or granulated form, fluorinated carbon, i.e. $-(CF_x)-$ wherein $x < 2$, or molybdenum disulfide. It has been discovered that the inclusion of the friction reducing agent ameliorates the effect of chance collisions of the rotating part with the stationary part of the devices and lessens the scoring effect of the impacts, enhancing the already improved toughness of the filler reinforced epoxy over the original metal wall material and minimizes the effect of impacts.

Proportions of the several ingredients is not narrowly critical. In general, the epoxy resin retains its strength with high filler loadings, with low to moderate levels of filler, such as from 0.3 to 55 parts of reinforcing filler being particularly suitable, based on 100 parts of the resin, and higher where the particular application is not highly critical and provided adhesion is maintained. Similarly, the friction reducing agent can be used in small but effective amounts, i.e. amounts tending to lower the coefficient of friction of the epoxy resin surface below that of epoxy resin and filler alone, including as little as 1 part by weight up to 20 and even 40 parts by weight based on the weight of the resin, again ensuring that sufficient adhesion is maintained to the metal substrate for the coating composition to function in the manner intended.

EXAMPLE 1

A gear pump for fuel was repaired to eliminate areas of severe galling on the pump housing wall resultant from wearing of the gear bearings and consequent sporadic contact of the rapidly turning (3000–5000 rpm) gears with the pump housing wall. The chief desideratum was to restore the precisely machined wall of the housing to original tolerances, and to do so in a permanent fashion.

A composition according to the invention is prepared as follows: In a suitable mixing vessel, a curable epoxy resin mixture of a general purpose adhesive epoxy resin comprising the diglycidyl ether of Bisphenol A and amine hardener comprising piperidine is prepared by mixing the two in proportions of 4 parts by weight hardener to 10 parts by weight resin with mild agitation. The mixture is briefly heated to initiate cure. After thickening of the mixture, 2 parts of coefficient of friction reducing agent comprising finely ground graphite and 1 part of reinforcing filler comprising finely fibrous kaolin is stirred into the thickened mixture. The mixture is spatulated onto the housing wall to a depth of more than redefine the surface contour and smoothed. Coverage of the galled areas is excellent and indistinguishable from other coverage of the walls. The housing with the repair composition coating in place is placed in an oven and heated to about 200° F. until the coating is fully cured, about two hours. The housing with the cured coating in place is then machined to bring the walls to their original specifications so as to maintain original design tolerances in the pump. In jet fuel pumping usage the coating shows no sign of adhesion loss, or physical or chemical deterioration after 7000 hours. The eventual wearing of the bushings and consequent contact between the pump gears and the coated walls is not catastrophic since the presence of the lubricating graphite tends to minimize galling even where impacts are severe or repeated, and as a result the part outlasts the original equipment metal wall.

EXAMPLE 2

Example 1 is duplicated but the graphite is replaced with 4 parts of finely particulate molybdenum disulfide. Results are equivalent.

EXAMPLE 3

Example 1 is duplicated but the kaolin is replaced with like size glass fiber and carbon fiber. Results are equivalent.

EXAMPLE 4

Example 1 is duplicated using 7 parts by weight of the kaolin. The batch is more difficult to work, but otherwise results are equivalent.

EXAMPLE 5

Example 1 is duplicated using 15 parts by weight of the graphite. Results are equivalent, indicating that the higher loading of graphite is not proportionately more advantageous.

EXAMPLE 6

Example 1 is duplicated using 12 parts by weight of fluorinated carbon in lieu of graphite, and pyridine as the hardener. Results are equivalent.

I claim:

1. Pump having low friction, anti-galling repair composition coated surfaces, said composition comprising a hardenable epoxy resin, a resin-reinforcing effective amount of a reinforcing filler other than asbestos in an amount between 0.3 and 55 parts by weight per 100 parts of resin, and an agent having a lower coefficient of friction than said epoxy resin, said agent comprising fluorinated carbon and being dispersed in said composition in surface coefficient of friction-reducing amount of from about 1 and 40 parts by weight per 100 parts by weight of said resin.

2. Pump according to claim 1, in which said reinforcing filler is inorganic.

3. Pump according to claim 1, in which said epoxy resin comprises a diglycidyl ether of a dihydric phenol.

4. Pump according to claim 1, in which said hardenable resin contains a hardener comprising an amine.

5. Pump according to claim 1, in which said reinforcing filler is a mineral.

6. Pump according to claim 5, in which said reinforcing filler is kaolin.

7. Pump according to claim 1, in which said reinforcing filler is kaolin.

8. Method of coating pumps, including applying to a pump surface to be coated a composition comprising a hardenable epoxy resin, a resin-reinforcing effective amount of reinforcing filler and a composition surface coefficient of friction reducing amount of a friction reducing agent comprising, fluorinated carbon, curing said composition in adhering relation to said surface, and finishing to a desired dimension.

* * * * *